(12) United States Patent
Elliott (10) Patent No.: US 11,928,495 B2
(45) Date of Patent: *Mar. 12, 2024

(54) VIRTUAL TRUSTED PLATFORM MODULES

(71) Applicant: Hewlett Packard Enterprise Development LP, Spring, TX (US)

(72) Inventor: Robert C. Elliott, Spring, TX (US)

(73) Assignee: Hewlett Packard Enterprise Development LP, Spring, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 18/060,209

(22) Filed: Nov. 30, 2022

(65) Prior Publication Data
US 2023/0095454 A1 Mar. 30, 2023

Related U.S. Application Data

(63) Continuation of application No. 16/803,308, filed on Feb. 27, 2020, now Pat. No. 11,544,096.

(51) Int. Cl.
*G06F 9/455* (2018.01)
*G06F 1/3203* (2019.01)
(Continued)

(52) U.S. Cl.
CPC ........ *G06F 9/45558* (2013.01); *G06F 1/3203* (2013.01); *G06F 9/30101* (2013.01);
(Continued)

(58) Field of Classification Search
CPC ............... G06F 9/45558; G06F 1/3203; G06F 9/30101; G06F 9/544; G06F 2009/45579;
(Continued)

(56) References Cited

U.S. PATENT DOCUMENTS 8,074,262 B2 12/2011 Scarlata
8,239,667 B2 8/2012 Durham
(Continued)

FOREIGN PATENT DOCUMENTS

CN 109358945 A 2/2019
CN 110515699 A 11/2019

OTHER PUBLICATIONS

1 of 4—Unified EFI, Inc., Advanced Configuration and Power Interface Specification, Version 6.0, Apr. 2015 (pp. 1-219).
(Continued)

*Primary Examiner* — Kenneth Tang
(74) *Attorney, Agent, or Firm* — Trop, Pruner & Hu, P.C.

(57) ABSTRACT

In some examples, a storage medium stores a plurality of information elements that relate to corresponding virtual trusted platform module (TPM) interfaces, where each respective information element of the plurality of information elements corresponds to a respective virtual machine (VM). A controller provides virtual TPMs for respective security operations. A processor resource executes the VMs to use the information elements to access the corresponding virtual TPM interfaces to invoke the security operations of the virtual TPMs, where a first VM is to access a first virtual TPM interface of the virtual TPM interfaces to request that a security operation of a respective virtual TPM be performed.

20 Claims, 5 Drawing Sheets

(51) Int. Cl.
  *G06F 9/30* (2018.01)
  *G06F 9/54* (2006.01)
(52) U.S. Cl.
  CPC .... *G06F 9/544* (2013.01); *G06F 2009/45579* (2013.01); *G06F 2009/45583* (2013.01); *G06F 2009/45595* (2013.01)
(58) Field of Classification Search
  CPC . G06F 2009/45583; G06F 2009/45595; G06F 2009/45587; G06F 9/45508; G06F 21/57
  See application file for complete search history.

(56) References Cited

U.S. PATENT DOCUMENTS

| | | | |
|---|---|---|---|
| 8,645,605 | B2 | 2/2014 | Subramaniyan et al. |
| 8,892,802 | B2 | 11/2014 | Amit et al. |
| 8,954,965 | B2 | 2/2015 | Novak et al. |
| 9,600,313 | B2 | 3/2017 | Nimmagadda et al. |
| 9,990,220 | B2 | 6/2018 | Vavrick et al. |
| 10,268,500 | B2 | 4/2019 | Liguori et al. |
| 10,318,311 | B2 | 6/2019 | Liguori et al. |
| 10,382,195 | B2 | 8/2019 | Brandwine et al. |
| 11,544,096 | B2 * | 1/2023 | Elliott ................. G06F 9/30101 |
| 2008/0046581 | A1 * | 2/2008 | Molina ................. H04L 9/3234 709/227 |
| 2008/0244569 | A1 | 10/2008 | Challener et al. |
| 2009/0007104 | A1 * | 1/2009 | Zimmer ................ G06F 21/606 718/1 |
| 2009/0086979 | A1 | 4/2009 | Brutch et al. |
| 2009/0165117 | A1 * | 6/2009 | Brutch .................... G06F 21/57 726/14 |
| 2009/0249053 | A1 * | 10/2009 | Zimmer .............. G06F 9/45558 713/2 |
| 2010/0125731 | A1 * | 5/2010 | Dasari ..................... G06F 21/57 713/155 |
| 2013/0326216 | A1 * | 12/2013 | Zimmer ................. G06F 21/57 713/164 |
| 2014/0059680 | A1 | 2/2014 | Kurien et al. |
| 2014/0173600 | A1 * | 6/2014 | Ramakrishnan Nair .................... G06F 9/461 718/1 |
| 2015/0149751 | A1 * | 5/2015 | Nemiroff ............. G06F 21/575 713/2 |
| 2016/0119141 | A1 * | 4/2016 | Jing ...................... H04L 9/3221 713/156 |
| 2017/0075717 | A1 | 3/2017 | Chen et al. |
| 2017/0094377 | A1 | 3/2017 | Herdrich et al. |
| 2018/0060077 | A1 * | 3/2018 | Abdulhamid .......... G06F 21/57 |
| 2019/0107965 | A1 | 4/2019 | Deval et al. |
| 2019/0207764 | A1 * | 7/2019 | Maximov ............. G06F 21/575 |
| 2019/0392143 | A1 | 12/2019 | Hall et al. |
| 2021/0194696 | A1 * | 6/2021 | Sahita ..................... G06F 21/53 |
| 2021/0255939 | A1 * | 8/2021 | Chaiken .............. G06F 11/0757 |

OTHER PUBLICATIONS 2 of 4—Unified EFI, Inc., Advanced Configuration and Power Interface Specification, Version 6.0, Apr. 2015 (pp. 220-481).
3 of 4—Unified EFI, Inc., Advanced Configuration and Power Interface Specification, Version 6.0, Apr. 2015 (pp. 482-744).
4 of 4—Unified EFI, Inc., Advanced Configuration and Power Interface Specification, Version 6.0, Apr. 2015 (pp. 745-1012).
Andre Richter et al., "Performance Isolation Exposure in Virtualized Platforms with PCI Passthrough I/o Sharing," 2014, pp. 1-12, Springer International Publishing, Switzerland.
Berger et al., vTPM: Virtualizing the Trusted Platform Module, USENIX Association, Security '06, 15th USENIX Security Symposium, 2006 (16 pages).
CMVP, "Validated FIPS 140-1 and FIPS 140-2 Cryptographic Modules", available online at <https://web.archive.org/web/20160414145244/http://csrc.nist.gov/groups/STM/cmvp/documents/140-1/1401val2016.htm>, Apr. 14, 2016, 52 pages.
Elliott et al., U.S. Appl. No. 16/803,293 entitled Virtual Serial Ports for Virtual Machines filed Feb. 27, 2020 (32 pages).
Felipe Huici et al., "Change: Enabling Innovation in the Internet Architecture Through Flexible Flow-processing Extensions," Apr. 23, 2014, pp. 1-72, CHANGE Consortium.
George Crump, "Offloading I/O from the Hypervisor with Sr-IOV," Sep. 29, 2010, pp. 1-3, Retrieved from the Internet on Oct. 17, 2019 at URL: <storage-switzerland.com/Articles/Entries/2010/9/29_Offloading_I_O_from_the_Hypervisor_with_SR-IOV.html>.
Github, "OSS-Fuzz: Continuous Fuzzing for Open Source Software", available online at <https://web.archive.org/web/20190427121111/https://github.com/google/oss-fuzz/>, Apr. 27, 2019, 4 pages.
HP, Technical White Paper, Implementing Windows Server 2012 SR-IOV (16 pages).
Intel, PCI-SIG Single Root I/O Virtualization (SR-IOV) Support in Intel(Registered) Virtualization Technology for Connectivity, White Paper, 2008 (4 pages).
Intel, PCI-SIG SR-IOV Primer, An Introduction to SR-IOV Technology, Intel(Registered) LAN Access Division, 321211-002, Revision 2.5, Jan. 2011 (28 pages).
Javier Echave, "Hyperflex Architecture and How It Works," Mar. 7, 2017, pp. 1-4, Retrieved from the Internet on Oct. 18, 2019 at URL: <gblog.cisco.com/ch-tech/hyperflex-architechture-and-how-it-works/>.
Lenovo, A Technical Introduction to the Use of Trusted Platform Module 2.0 with Linux, Last Update: Sep. 8, 2017 (28 pages).
Marcus Sundberg and Erik Nilsson, "Emulation of TPM on Raspberry Pi," Master's Thesis, Mar. 19, 2015, pp. 1-77, Lund University, Sweden.
Microsoft Docs—Guarded fabric and shielded VMs overview, Aug. 28, 2018 (13 pages).
Microsoft Docs, "Windows Hardware Lab Kit", available online at <https://web.archive.org/web/20190423042018/https://docs.microsoft.com/en-us/windows-hardware/test/hlk/>, Nov. 2, 2018, 5 pages.
Microsoft Docs, Trusted Execution Environment ACPI Profile, Oct. 10, 2018 (33 pages).
Microsoft, "Hardware Watchdog Timers Design Specification", 2008, 12 pages.
Mike Foley, blogs.vmware.com, vSphere 6.7—Virtual Trusted Platform Modules, May 2, 2018 (14 pages).
PCI-SIG, PCI Code and ID Assignment Specification, Revision 1.11, Jan. 24, 2019 (25 pages).
Robert C. Elliott, U.S. Appl. No. 16/803,304 entitled System Reset Using a Controller filed Feb. 27, 2020 (32 pages).
Scott's Weblog, What is SR-IOV? Dec. 2, 2009 (5 pages).
Sourceforge, kagoldman, IBM's Software TPM 2.0 Last Update Apr. 10, 2019 (4 pages).
SR-IOV Virtual Functions (VFs), Windows drivers_Microsoft Docs, Apr. 19, 2017 (1 page).
TCG ACPI Specification, Family "1.2" and "2.0", Version 1.2, Revision 8, Aug. 18, 2017 (23 pages).
TCG PC Client Platform Firmware Profile Specification, Family "2.0", Level 00 Revision 1.04, Jun. 3, 2019 (123 pages).
Wikipedia, "Fuzzing", available online at <https://en.wikipedia.org/w/index.php?title=Fuzzing&oldid=909756792>, Aug. 7, 2019, 11 pages.
Wikipedia, Single-root input/output virtualization last edited Sep. 26, 2019 (4 pages).
Zimmerman, Google Cloud, Identity & Security, Virtual Trusted Platform Module for Shielded VMs: security in plaintext, Aug. 6, 2018 (9 pages).

* cited by examiner

VIRTUAL TRUSTED PLATFORM MODULES

BACKGROUND

A computer system includes various electronic components, such as a processor, a memory, a persistent storage, a network interface controller, and so forth. Machine-readable instructions, including software programs and/or firmware programs, can be executed on the processor. A user, a program, or an electronic component can perform a security operation using a trusted platform module (TPM) in the computer system.

BRIEF DESCRIPTION OF THE DRAWINGS

Some implementations of the present disclosure are described with respect to the following figures.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an", or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

Examples of computer systems can include any of the following: a desktop computer, a notebook computer, a tablet computer, a server computer, a smartphone, a wearable device (e.g., a smart watch, smart eyeglasses, a head-mounted device, etc.), a game appliance, an Internet-of-Things (IoT) device, a printing system, a storage appliance, a communication node, and so forth.

Some computer systems can include trusted platform modules (TPMs) to perform security operations to make the computer systems more secure against attacks or unauthorized access.

As used here, a "TPM" can refer to any component that performs specified security operations. In some examples, the TPM operates according to a security specification defined by the Trusted Computing Group (TCG). In other examples, a TPM can operate according to other standards or according to proprietary protocols.

Typically, a TPM is implemented using hardware, such as with an integrated circuit (IC) chip. The TPM can perform operations in response to commands issued by machine-readable instructions. Examples of security operations that can be performed by the TPM include any or some combination of the following: cryptographic key generation to produce a key, data encryption (based on use of an encryption key), data decryption, signing data, migration of keys between TPMs, random number generation, hashing data, and any other cryptographic operations or other security operations. In some examples, a TPM can also provide secure storage for certain information such as cryptographic keys.

Some computer systems may implement virtualization, in which multiple virtual machines (VMs) can be executed in a computer system (such VMs are also considered to be hosted by the computer system). The VMs can share the physical resources (e.g., a processor, a memory, a persistent storage, a network interface controller, etc.) of the computer system. A "virtual machine" or "VM" can refer to a partition of a computer system in which machine-readable instructions (e.g., a guest OS, an application program, etc.) can run while being isolated from machine-readable instructions executed in another VM. In some examples, a container can also be considered a VM.

A computer system that implements virtualization can also include a hypervisor, which is also referred to as a virtual machine monitor (VMM). The hypervisor (which includes machine-readable instructions) can create VMs that are run in the computer system, and the hypervisor can manage the execution of the VMs and the sharing of computer system physical resources by the VMs. The hypervisor can emulate the physical resources of the computer system such that a VM can access the emulated physical resources, and the hypervisor can provide isolation between VMs.

In a computer system including VMs, virtual TPMs are used instead of a physical TPM. The virtual TPMs can be provided based on emulation of TPMs by the hypervisor. TPM emulation by the hypervisor consumes physical resources of the computer system, including processor resources. In a computer system including a large number of VMs, TPM emulation can consume cycles of a processor, which can slow down other operations of the computer system. As another example, a VM infected with malware or a VM that is malfunctioning may issue a large number of TPM accesses, which can cause the computer system to slow down if TPM emulation is performed by the hypervisor to handle such TPM accesses. Each TPM access may trigger the virtual TPM to perform processor-intensive operations.

In accordance with some implementations of the present disclosure, TPM emulation is offloaded from the hypervisor to a platform controller that is separate from the hypervisor. The platform controller implements virtual TPMs. As a result, TPM emulation does not consume processor resources of the computer system. A "platform controller" can refer to a controller that performs specified tasks in a computer system. In some examples, the platform controller is a bus device on a bus, such as a Peripheral Component Interconnect (PCI) bus. In more specific examples, the PCI bus can be a PCI Express (PCIe) bus. In other examples, the platform controller can be a bus device connected to another type of bus in a system. A "bus" refers to a communication link over which multiple devices can communicate with one another.

The platform controller is separate from the main processor of the system, where the main processor can execute various machine-readable instructions of the system, such as VMs, an operating system, an application program, firmware (e.g., boot code, hardware initialization code, etc.), and so forth. The platform controller can be designated to perform specified tasks of the system, including emulation of reset ports as well as other tasks (e.g., power management tasks, thermal management tasks, system monitoring tasks, etc.). In some examples, the platform controller can be a separate system-on-chip coupled to the main processor. In more specific examples, the platform controller can be made from a smart network interface controller (NIC), or be part of a baseboard management controller (BMC). The platform controller can have its own processing circuitry (that is separate from the main processor executing the OS and/or other program code of a computer system) and run its own firmware. A BMC is a specialized service processor that can monitor the physical state of a computer system using sensors and communicates with a management system through an independent out-of-band connection.

The BMC may also communicate with applications executing at the OS level through an input/output controller (IOCTL) interface driver, a Representational state transfer (REST) application program interface (API), or some other system software proxy that facilitates communication between the BMC and applications. The BMC may have hardware level access to hardware components located in the computer system. The BMC may be able to directly modify the hardware components. The BMC may operate independently of the OS of the computer system that the BMC is located in. The BMC may be located on the motherboard or main circuit board of the computer system to be monitored. The fact that a BMC is mounted on a motherboard of the managed computer system or otherwise connected or attached to the managed computer system does not prevent the BMC from being considered separate from a processing resource that executes the OS. A BMC has management capabilities to manage components of the computer system. Examples of management capabilities of the BMC can include any or some combination of the following: power control, thermal monitoring and control, fan control, system health monitoring, remote access of the computer system, remote reboot of the computer system, system setup, OS image deployment and recovery, system security, and so forth.

In some examples, a BMC can provide so-called "lights-out" functionality for computer systems. The lights out functionality may allow a user, such as a systems administrator to perform management operations on the computer system even if an OS is not installed or not functional on the computer system. Moreover, in some examples, the BMC can run on auxiliary power (e.g., battery power or an auxiliary power rail); as a result, the computer system does not have to be powered on to allow the BMC to perform its operations. The services provided by the BMC may be considered "out-of-band" services, since the OS may not be running and in some cases the computer system may be powered off or is not functioning properly (e.g., the computer system has experienced a fault or hardware failure).

The BMC may include a communication interface, such as a network interface, and/or a serial interface that an administrator or other entity can use to remotely communicate with the BMC. An "out-of-band" service can be provided by the BMC via a dedicated management channel (e.g., the communication interface) and is available whether the computer system is in a powered on state. In some examples, the BMC is an example of the platform controller.

The platform controller provides a separate physical processor (separate from the main processor of the system) in which TPM emulation can be provided in a secure manner. For example, the platform controller is protected against attacks which may affect operations of the main processor, such as when malware infects a system and executes on the main processor. In some examples, the platform controller provides a smaller attack surface than the main processor running the hypervisor and other system code, such as firmware and an OS. The main processor has a larger attack surface because the main processor is to execute a number of different types of machine-readable instructions, including an OS, an application program, a VM, and so forth, any of which may become compromised such as due to infection by malware or another type of corruption. In contrast, the platform controller is designated to execute specified code that may be more immune to compromise by malware or other corruption. As a result, by implementing TPM emulation at the platform controller, protection is provided against a compromised hypervisor when performing TPM operations.

Offloading TPM emulation to the platform controller reduces processor resource consumption overhead by the hypervisor to perform operations of a TPM on behalf of a VM.

An issue associated with implementing virtual TPMs on the platform controller is that a bus standard such as PCIe does not define an interface to a virtual TPM. For example, no PCI function is defined for a device type of TPM. For example, the PCI Code and ID Assignment Specification as promulgated by PCI Special Interest Group (PCI-SIG) does not include a class code definition for a TPM. The PCI-SIG is a community that defines standards relating to PCIe.

In accordance with some implementations of the present disclosure, Advanced Configuration and Power Interface (ACPI) data structures can be used to provide separate virtual TPM interfaces for corresponding VMs.

Figure 1A:
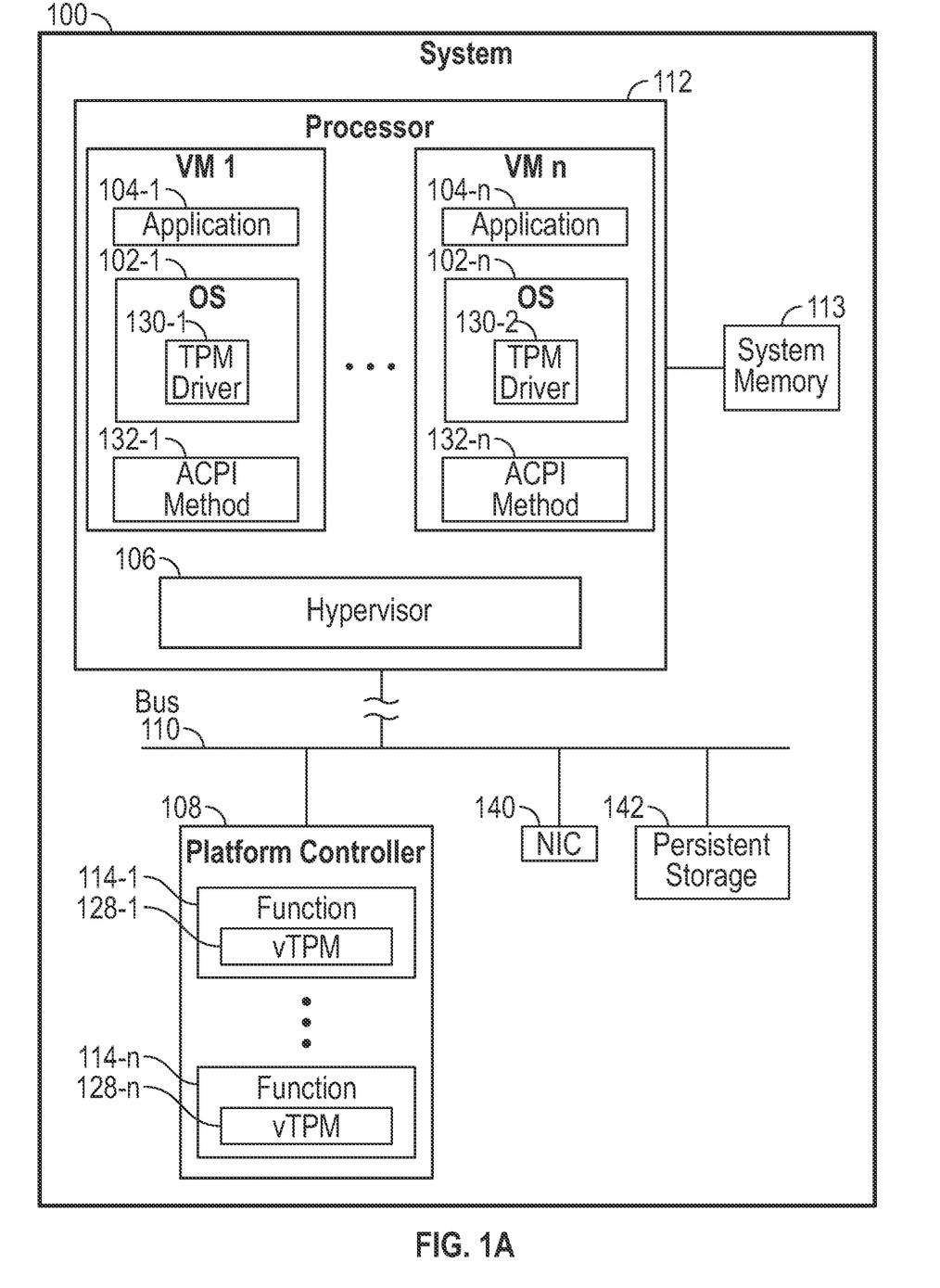
FIG. 1A is a block diagram of a system according to various examples.

FIG. 1A is a block diagram of a system 100. The system 100 can include a computer system or multiple computer systems.

The system 100 includes n VMs (VM 1 to VM n depicted in FIG. 1A), where n≥1. VMs can be started on demand by a user or other entity. The system 100 can start with zero VMs, and additional VM(s) is (are) started when requested. Each VM includes a respective guest OS. VM 1 includes a guest OS 102-1, and VM n includes a guest OS 102-n. Examples of the guest OSes include a LINUX OS, a WINDOWS OS, and/or other types of OSes. The different guest OSes 102-1 to 102-n can be of the same type or of different types. Each VM can also include a respective application program (or multiple application programs) executing in the VM. For example, VM 1 includes an application program 104-1, and VM n includes an application program 104-n. Note that prior to the creation of a VM, there is no guest OS 102-i (i=1 to n) and no application program 104-i.

The system 100 further includes a hypervisor 106 that creates the VMs, manages execution of the VMs, emulates physical resources of the system 100 that are accessible by the VMs, provides isolation between the VMs, and performs other virtualization tasks.

In accordance with some implementations of the present disclosure, instead of emulating a TPM using the hypervisor 106, TPM emulation can be offloaded to a platform controller 108 of the system 100. In some examples, the platform controller 108 is a bus device on a bus 110 of the system 100. For example, the bus 110 can be a PCIe bus. In other examples, the bus 110 can be a different type of bus or other type of communication fabric.

The platform controller 108 can be implemented using any type of hardware processing circuitry, including, as examples, a microcontroller, a programmable integrated circuit device (such as an application specific integrated circuit or ASIC device), a programmable gate array, a microprocessor, or any other type of hardware processing circuit.

In some examples, the platform controller 108 is separate and distinct from a processor (or processors) 112 of the system 100. A processor can include a microprocessor, a core of a multi-core microprocessor, a microcontroller, a programmable integrated circuit, a programmable gate array, a digital signal processor, or another hardware processing circuit.

The processor 112 is coupled to the bus 110, either directly or through another device, such as a bridge device. The processor 112 executes machine-readable instructions of the system 100, including the hypervisor 106 and the VMs, a host OS (if present), as well as other programs (including software programs and/or firmware programs). The processor 112 can be coupled to a system memory 113, which can include a memory device or multiple memory devices to store data and machine-readable instructions. A memory device can include a volatile memory device such as a dynamic random access memory or DRAM device, a static random access memory or SRAM device, etc.). Alternatively, a memory device can include a nonvolatile memory device. Although not shown, the system memory 113 can include a memory controller, or alternatively, a memory controller is connected to the memory device(s) to control access of data in the memory device(s).

Other devices can also be connected to the bus 110, including a network interface controller (NIC) 140 and a persistent storage 142. The NIC 140 is able to communicate over a network, such that components of the system 100, including the VMs, are able to communicate with other entities over the network through the NIC 140. In further examples, a physical TPM may also be connected to the bus 110.

The persistent storage 142 can store data that persists even if power is removed from the system 100 or the persistent storage 142. The persistent storage 142 can be implemented using a nonvolatile storage device (or multiple nonvolatile storage devices). A nonvolatile storage device can include a flash memory device, a disk-based storage device, and so forth.

In some examples, TPM emulation can be performed using PCI functions 114-1 to 114-n that are provided by the platform controller 108. The hypervisor 106 can assign a PCI function (or multiple PCI functions) to each VM.

In some examples, the PCI functions 114-1 to 114-n can include virtual functions (VFs) that are according to PCIe single root I/O virtualization (SR-IOV), as defined by the PCI-SIG. The PCI functions 114-1 to 114-n contain respective virtual TPMs (vTPMs) 128-1 to 128-n. Instead of implementing physical TPMs, vTPMs 128-1 to 128-n contained in the PCI functions 114-1 to 114-n are provided by the platform controller 108.

Figure 1B:
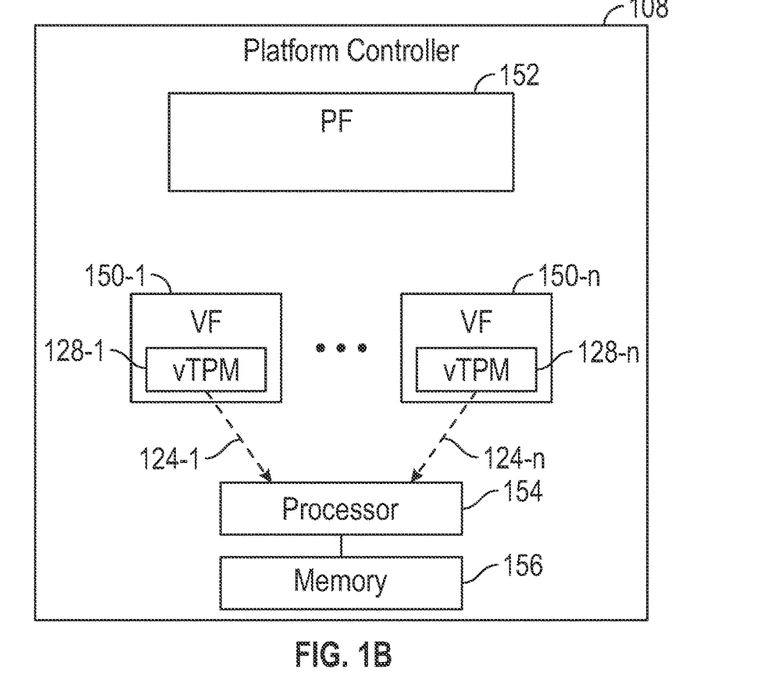
FIG. 1B is a block diagram of a platform controller according to some examples.

FIG. 1B shows further details of the platform controller 108 according to some examples. The platform controller 108 can have other implementations in other examples. SR-IOV allows a PCIe device (such a TPM implemented by the platform controller 108 of FIG. 1) to present itself to a host (e.g., the system 100) as multiple distinct virtual devices. The PCIe device (e.g., the platform controller 108) implements a PCIe physical function (PF) 152 that is partitioned into multiple VFs 150-1 to 150-n for the purpose of sharing the PCIe device's resources in a virtual environment.

The PF 152 provides control over the creation and allocation of VFs. The PF 152 contains an SR-IOV capability structure and manages the SR-IOV functionality. The PF 152 can be discovered, managed, and manipulated like any other PCIe device in the system 100.

In other examples, the PCI functions 114-1 to 114-n of FIG. 1A can be implemented as another type of function.

Each VF 150-$i$ (i=1 to n) contains a corresponding vTPM 128-$i$. In the example of FIG. 1B, the VF 150-1 is assigned to VM 1, the VF 150-n is assigned to VM n, and so forth. The vTPM 128-1 emulates a serial port for VM 1, and the vTPM 128-n emulates the serial port for VM n.

The platform controller 108 of FIG. 1B further includes a processor 154 and a memory 156. The processor 154 of FIG. 1B is to execute instructions of the platform controller 108 to perform tasks of the platform controller 108.

In some examples, the hypervisor 106 is able create multiple vTPMs 128-1 to 128-n, which are contained in respective VFs 114-1 to 114-n partitioned from the PF 152 implemented by the platform controller 108.

In some examples, the hypervisor 106 creates a vTPM on demand for a respective VM (i.e., the vTPM is not created for the VM until a VM or another entity requests the creation of the vTPM). In other examples, corresponding vTPMs can be created by the hypervisor 106 as VMs are created.

In the example of FIG. 1, the vTPM 128-1 is assigned to VM 1 by the hypervisor 106, the vTPM 128-n is assigned to VM n by the hypervisor 106, and so forth. Each vTPM can support a unique and separate data path for I/O-related functions (e.g., TPM reads and writes) within the PCIe hierarchy. The vTPM 128-1 emulates a TPM for VM 1, and the vTPM 128-n emulates a TPM for VM n.

The vTPMs 128-1 to 128-n share the platform controller's underlying hardware and PCIe interface to the PCI bus 110.

In accordance with some implementations of the present disclosure, SR-IOV enables TPM accesses by VMs to bypass an emulation layer in the hypervisor 106. VFs according to SR-IOV are lightweight so that a large number of VFs can be implemented in the platform controller 108. For example, if the system 100 includes a large number of VMs, a corresponding large number of VFs can be implemented on the platform controller 108 to perform TPM emulation for the respective VMs.

Figure 1C:
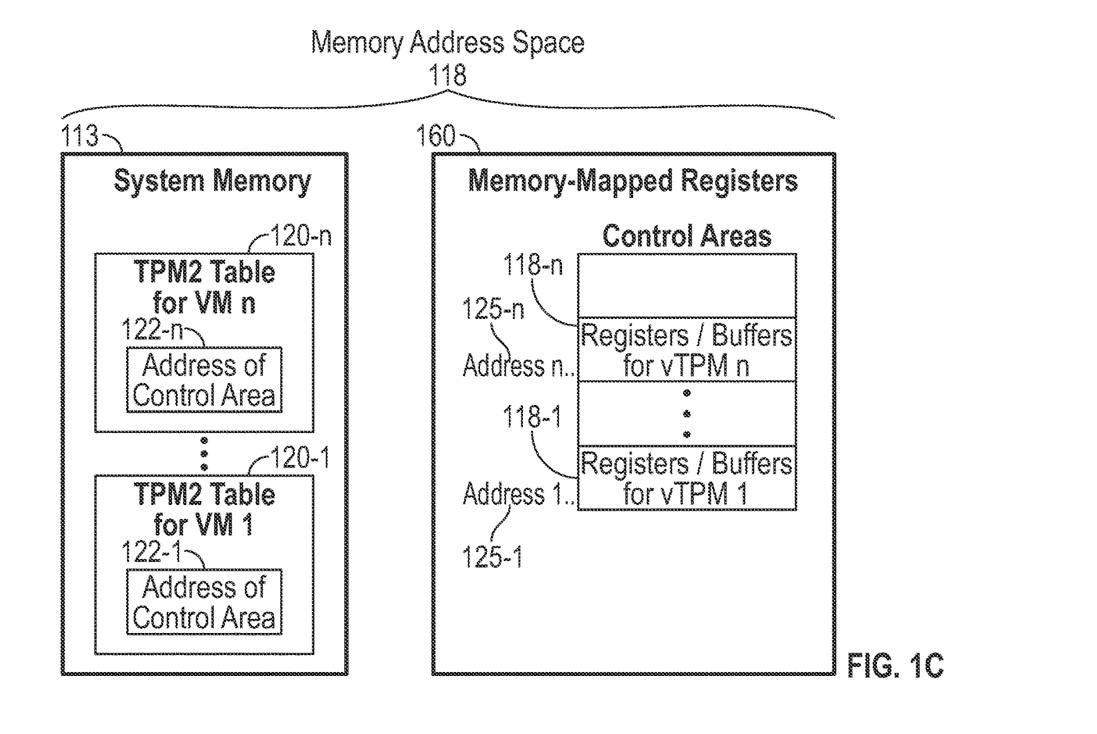
FIG. 1C is a block diagram of a memory address space according to some examples.

When the hypervisor 106 creates vTPMs 128-1 to 128-n, the vTPMs are assigned addresses of control areas containing status registers and locations of memory buffers for the respective vTPMs. The status registers and memory buffers are used to allow interaction between each VM and the corresponding vTPM. Control areas 118-1 to 118-n are shown in FIG. 1C. The control area 118-1 includes the status registers and locations of memory buffers for a vTPM 128-1, the control area 118-n includes the status registers and locations of memory buffers for a vTPM 128-n, and so forth.

The control areas 118-1 to 118-n are presented by the platform controller 108. For example, the control areas 118-1 to 118-n can be implemented with registers in the platform controller 108, for example. The control areas 118-1 to 118-n include memory-mapped registers (in a region indicated as 160) that are mapped to a memory address space 118.

In some examples, TPM functionality can be according to TPM 2.0, as defined by TCG PC Client Platform Firmware Profile Specification, Family 2.0. In other examples, TPM functionality can be according to other TPM Specifications.

According to TPM 2.0, access of a TPM can be performed by reads and writes to arbitrarily specified addresses. Such reads and writes include reads and writes of the registers and memory buffers associated with the control areas of the respective vTPMs.

In some examples, each VM is associated with a set of ACPI tables as well as ACPI methods, which can be provided by the hypervisor 106. ACPI tables are used to store information relating to ACPI operations, including any or some combination of discovering and configuring hardware components, performing power management, performing status monitoring of components, and other operations. An ACPI method refers to a routine including machine-readable instructions that can be invoked to perform ACPI operations.

One of the ACPI tables that can be associated with each VM is a TPM2 table. FIG. 1 shows TPM2 table 120-1 for vTPM 128-1, TPM2 table 120-n for vTPM 128-n, and so forth. The TPM2 tables 120-1 to 120-n can be stored in the system memory 113, and can be mapped to the memory address space 118. The TPM2 table 120-1 contains the address 122-1 of the control area 118-1, the TPM2 table 120-n contains the address 122-n of the control area 118-n, and so forth. The addresses stored in the TPM2 tables 120-1 to 120-n are programmed by the hypervisor 106.

Note that the addresses 122-1 to 122-n contained in the respective TPM2 tables 120-1 to 120-n can be logical addresses (instead of physical addresses) of the respective control areas 118-1 to 118-n. The hypervisor 106 can provide mapping information (not shown) to map the logical addresses 122-1 to 122-n in the TPM2 tables 120-1 to 120-n to respective physical addresses 125-1 to 125-n that identify the locations of the respective control areas 118-1 to 118-n. For example, the physical address 125-1 can identify the base address of the control area 118-1, the physical address 125-n can identify the base address of the control area 118-n, and so forth.

The mapping information to map the logical addresses 122-1 to 122-n to the physical address 125-1 to 125-n can be in the form of a memory management unit (MMU) table associated with the processor 112, for example. The mapping information can have other forms in other examples.

Note that the logical addresses 122-1 to 122-n may be the same logical address, except that they are mapped to different physical address 125-1 to 125-n by the mapping information. Alternatively, the logical addresses 122-1 to 122-n may be different logical addresses.

Each vTPM 128-i can detect writes or reads by VMs or other entities (whether internal or external of the system 100) to the registers/buffers in the respective control area 118-i. Writes and reads are directed to a respective vTPM 128-i. In response to a write or read, the vTPM 128-i can signal an interrupt to the processor 154 (FIG. 1B) inside the platform controller 108, such as using a respective TPM indication 124-i. The TPM indication 124-i can indicate which of the registers/buffers of the control area 118-i has been written to or read from. The TPM indication 124-i can include a signal, an interrupt, a command, or any other indication relating to TPM operations. The TPM indication 124-i can include information that identifies which VF 150-i the TPM indication 124-i is associated with, and which register/buffer was written to or read from.

In response to the TPM indication 124-i, machine-readable instructions (e.g., firmware) running on the processor 154 can redirect TPM traffic or synthesize a proper response for a TPM operation. In other examples, the vTPM 128-i contains hardware that moves the data or synthesizes a response under the orchestration of machine-readable instructions (e.g., firmware) running on the processor 154.

The memory address space 118 to which the control areas 118-1 to 118-n and the TPM2 tables 120-1 to 120-n are mapped can be implemented using either TPM 2.0 device memory or in a memory region reserved by the system 100 during boot for TPM.

Memory addresses of the memory address space 118 can be mapped to the memory controller and/or a PCIe controller or any other device on the bus 110. The memory controller is connected to a memory device (or alternatively, multiple memory devices) that is (are) part of the system memory 113. A PCIe controller is connected to a PCIe device. A PCIe device can support memory accesses, but they may not really access memory devices such as DRAMs or SRAMs. Instead, a PCIe device may access memory-mapped registers that are part of the system memory address space.

The TPM2 tables 120-1 to 120-n (along with other ACPI tables) are part of the respective contexts of corresponding VMs.

As further shown in FIG. 1, each guest OS 102-i (i=1 to n) of a respective VM i includes a TPM driver 130-i. Each VM i also includes an ACPI method 132-i (that can be part of a set of ACPI methods invocable by the guest OS 102-i).

Figure 2:
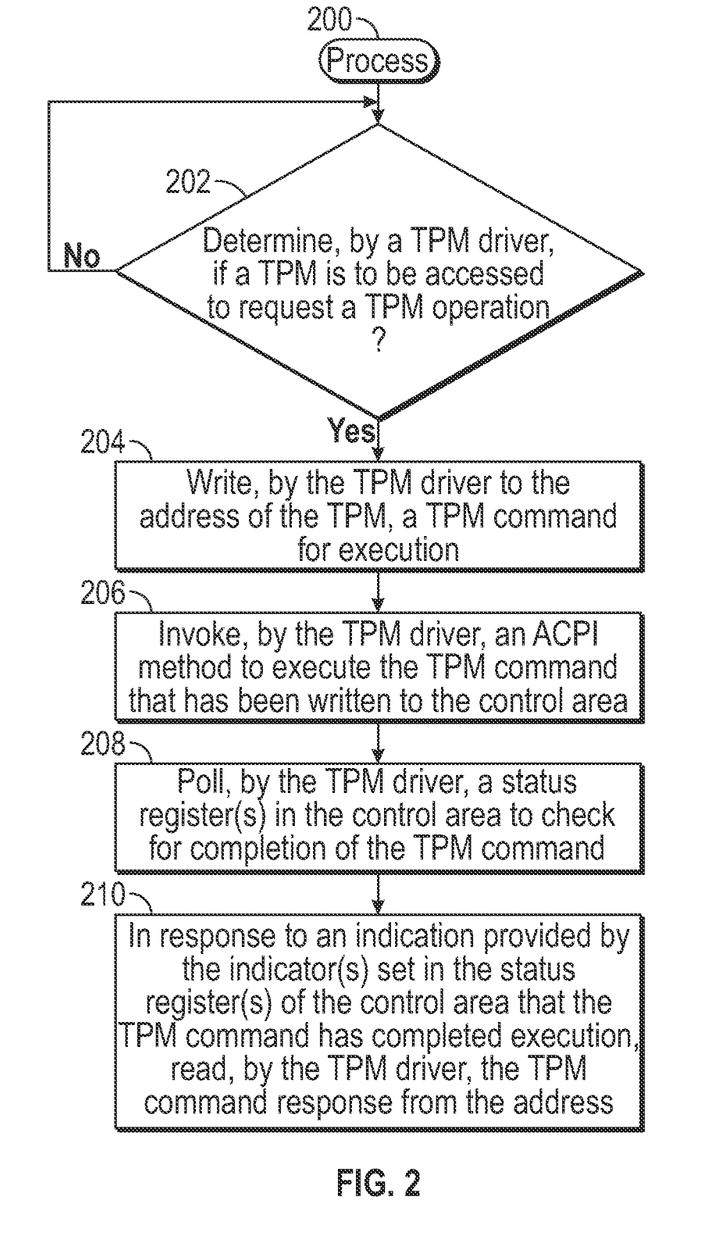
FIG. 2 is a flow diagram of a process according to some examples.

FIG. 2 shows an example process 200 of how a VM can invoke a TPM operation according to some implementations of the present disclosure. In other examples, a different process is employed.

A TPM driver 130-i (one of the TPM drivers 130-1 to 130-n of FIG. 1) makes a determination (at 202) if a TPM is to be accessed to request a TPM operation. This determination may be in response to a request from an entity (e.g., a user, a program such as the guest OS 102-i or the application program 104-i, or a machine) that indicates that the TPM operation is to be performed. In other examples, the determination that the TPM is to be accessed can be performed by the TPM driver 130-i in response to other factors or events.

In response to the determination that the TPM is to be accessed, the TPM driver 130-i writes (at 204) a TPM command for execution to the address of the TPM, where the address is the address 122-i read from the TPM2 table 120-i earlier during initialization of the TPM driver 130-i in the VM i. The TPM command can be written to the control area 118-i referred to by the address 122-i. In some examples, the TPM command can include multiple bytes that are to be written to the control area 118-i (such as to the memory buffers of the control area 118-i). After the multiple bytes of the TPM command are written to the control area 118-i, the TPM driver 130-i invokes (at 206) an ACPI method (e.g., the ACPI method 132-i) to execute the TPM command that has been written to the control area 118-i. Note that the invoked ACPI method is executed in the context of VM i.

The TPM driver 130-i polls (at 208) a status register (or multiple status registers) in the control area 118-i to check for completion of the TPM command. When the TPM command completes execution, the ACPI method invoked to execute the TPM command sets an indicator in a respective status register (or sets indicators in respective status registers) of the control area 118-i.

In response to an indication provided by the indicator(s) set in the status register(s) of the control area 118-i that the TPM command has completed execution, the TPM driver 130-i reads (at 210) the TPM command response from the address 122-*i*. The TPM command response can be stored in a memory buffer in the control area 118-*i*.

Figure 3:
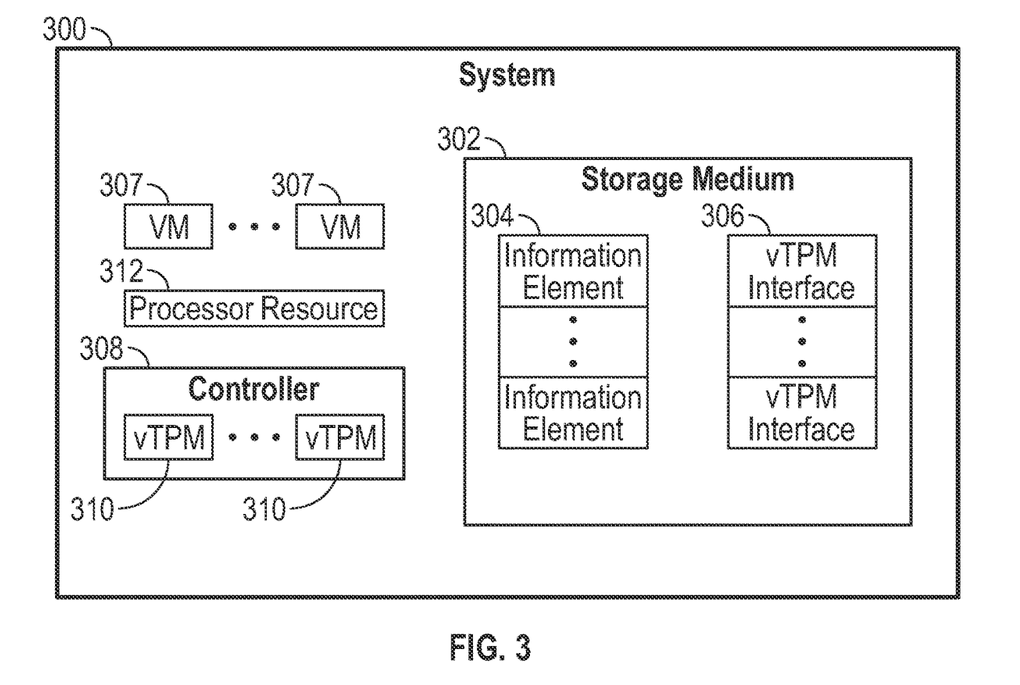
FIG. 3 is a block diagram of a system according to further examples.

FIG. 3 is a block diagram of a system 300 that includes a storage medium 302 to store information elements 304 (e.g., the ACPI TPM2 tables 120-1 to 120-*n* of FIG. 1) that relate to corresponding vTPM interfaces 306 (e.g., the control areas 118-1 to 118-*n* of FIG. 1). Each respective information element 304 corresponds to a respective VM of multiple VMs 307 in the system 100.

The information elements 304 contain addresses (e.g., 122-1 to 122-*n* of FIG. 1) of the corresponding vTPM interfaces 306. The addresses of the corresponding vTPM interfaces 306 are logical addresses to be mapped to physical memory addresses identifying the corresponding vTPM interfaces 306.

The system 300 further includes a controller 308 (e.g., the platform controller 108 of FIG. 1) to provide vTPMs 310 for respective security operations.

The system 300 further includes a processor resource 312 (e.g., the processor 112 of FIG. 1) to execute the multiple VMs 307 to use the information elements 304 to access the corresponding vTPM interfaces 306 to invoke the security operations of the vTPMs 310. A first VM of the multiple VMs 307 is to access a first vTPM interface of the vTPM interfaces 306 to request that a security operation of a respective vTPM be performed.

In some examples, each vTPM interface of the corresponding vTPM interfaces 306 includes a control area to which a command is writeable to request a TPM operation, and from which a result of the TPM operation is readable.

Figure 4:
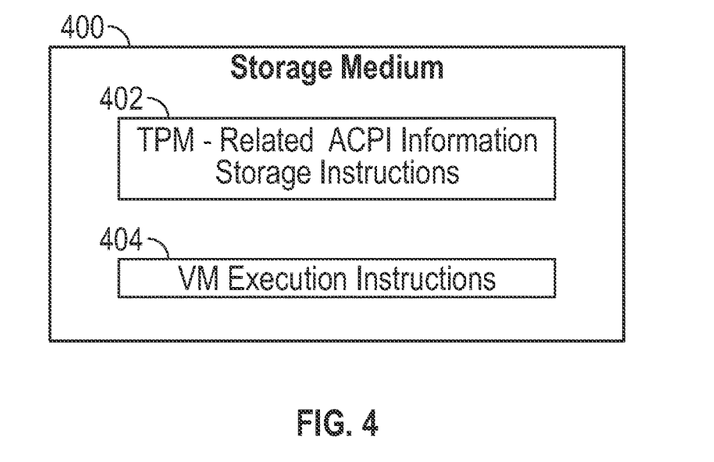
FIG. 4 is a block diagram of a storage medium storing machine-readable instructions according to some examples.

FIG. 4 is a block diagram of a non-transitory machine-readable or computer-readable storage medium 400 storing machine-readable instructions that upon execution cause a system to perform various tasks.

The machine-readable instructions include TPM-related ACPI information storage instructions 402 to store ACPI information that relates to corresponding vTPM interfaces, where the vTPM interfaces are provided by a controller and are associated with respective VMs.

The machine-readable instructions further include VM execution instructions 404 to execute the VMs to use the ACPI information to access the corresponding vTPM interfaces, where a first VM is to access a first vTPM interface of the vTPM interfaces to request a security operation of a respective vTPM.

Figure 5:
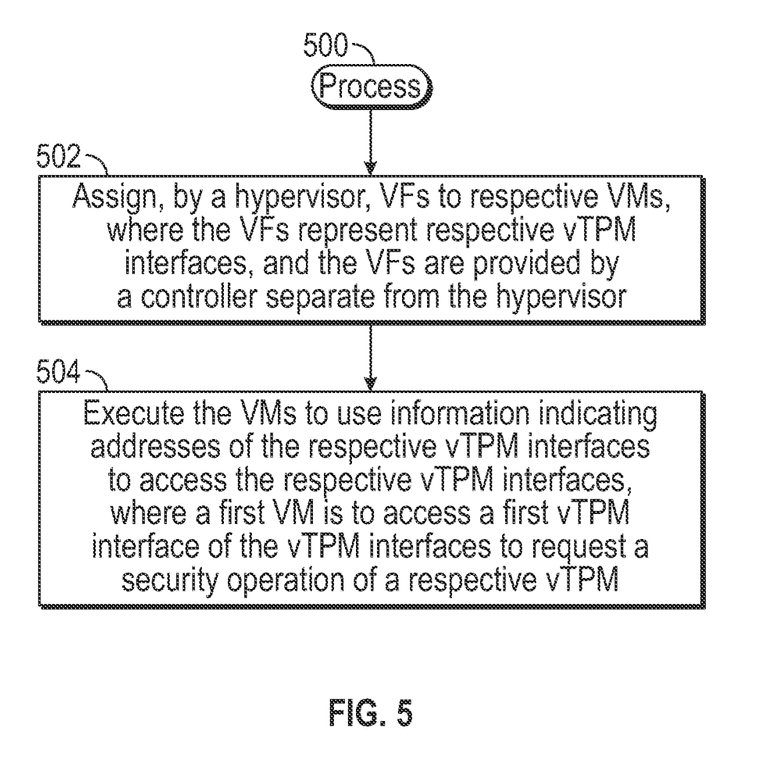
FIG. 5 is a flow diagram of a process according to further examples.

FIG. 5 is a flow diagram of an example process 500 according to some implementations of the present disclosure.

The process 500 includes assigning (at 502), by a hypervisor, VFs to respective VMs, where the VFs represent respective vTPM interfaces, and the VFs are provided by a controller separate from the hypervisor.

The process 500 includes executing (at 504) the VMs to use information indicating addresses of the respective vTPM interfaces to access the respective vTPM interfaces, wherein a first VM is to access a first vTPM interface of the vTPM interfaces to request a security operation of a respective vTPM.

A storage medium (e.g., 302 in FIG. 3 or 400 in FIG. 4) can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disc (CD) or a digital video disc (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A system comprising:
   a hypervisor;
   a storage medium to store a plurality of information elements comprising addresses referring to control areas of corresponding virtual trusted platform module (TPM) interfaces;
   a hardware controller separate from the hypervisor and comprising the control areas, the hardware controller to:
   perform TPM emulation that provides a plurality of virtual TPMs for respective security operations, the plurality of virtual TPMs invocable by commands written to the control areas; and
   a processor resource separate from the hardware controller to execute a plurality of virtual machines (VMs),
   a first VM of the plurality of VMs to write a command to a first control area in the hardware controller using the address in a first information element of the plurality of information elements to request the security operation of a first virtual TPM of the plurality of virtual TPMs.

2. The system of claim 1, wherein the plurality of information elements are included in Advanced Configuration and Power Interface (ACPI) tables.

3. The system of claim 2, wherein the ACPI tables comprise ACPI TPM tables.

4. The system of claim 1, wherein the control areas in the hardware controller comprise respective registers referred to by the addresses in the plurality of information elements.

5. The system of claim 4, wherein the addresses in the plurality of information elements are logical addresses to be mapped to physical memory addresses identifying the registers.

6. The system of claim 1, wherein the first VM is to receive a response to the command through the first control area in the hardware controller.

7. The system of claim 1, wherein each control area of the control areas comprises a memory buffer and a register of the hardware controller.

8. The system of claim 1, wherein the plurality of virtual TPMs comprise virtual functions (VFs).

9. The system of claim 8, wherein the VFs comprise single root I/O virtualization (SR-IOV) VFs.

10. The system of claim 1, wherein the hypervisor is to create the plurality of information elements for the plurality of VMs.

11. The system of claim 10, wherein the hypervisor is to assign the plurality of virtual TPMs to respective VMs of the plurality of VMs.

12. The system of claim 11, wherein the hypervisor is to:
assign the addresses for the control areas of the virtual TPM interfaces, and
include the addresses in the information elements.

13. The system of claim 1, wherein the security operations of the plurality of virtual TPMs are executable without performing TPM emulation at the hypervisor.

14. A non-transitory machine-readable storage medium comprising instructions that upon execution cause a system to:
store Advanced Configuration and Power Interface (ACPI) information that relates to corresponding virtual trusted platform module (TPM) interfaces, wherein the virtual TPM interfaces comprise control areas in a hardware controller and are associated with respective virtual machines (VMs) of a plurality of VMs, wherein the hardware controller is separate from a hypervisor of the system and is to perform TPM emulation that provides a plurality of virtual TPMs for respective security operations, wherein the plurality of virtual TPMs are invocable by commands written to the control areas, and wherein the ACPI information comprises addresses referring to the control areas in the hardware controller;
execute, on a processor resource separate from the hardware controller, the plurality of VMs; and
write, by the plurality of VMs, the commands to the respective control areas in the hardware controller using the addresses in the ACPI information to request the security operations of the plurality of virtual TPMs.

15. The non-transitory machine-readable storage medium of claim 14, wherein the ACPI information comprises ACPI TPM tables.

16. The non-transitory machine-readable storage medium of claim 14, wherein the control areas comprise registers, in the hardware controller, that are referred to by the addresses.

17. The non-transitory machine-readable storage medium of claim 16, wherein each control area of the control areas further comprises a memory buffer, and wherein the addresses map to a memory address space containing the control areas.

18. The non-transitory machine-readable storage medium of claim 14, wherein the plurality of virtual TPMs comprise virtual functions (VFs).

19. A method comprising:
assigning, by a hypervisor in a system comprising a processor resource, virtual functions to respective virtual machines (VMs) of a plurality of VMs, wherein the VFs represent respective virtual trusted platform modules (TPMs) emulated by a hardware controller that is separate from the processor resource that executes the hypervisor;
storing, in a memory, a plurality of information elements comprising addresses referring to corresponding control areas of virtual trusted platform module (TPM) interfaces, wherein the control areas are in the hardware controller and the virtual TPMs are invocable by commands written to the control areas;
executing, on the processor resource, the plurality of VMs; and
writing, by a first VM of the plurality of VMs using the address in a first information element of the plurality of information elements, a command to a first control area of the control areas in the hardware controller to request the security operation of a first virtual TPM of the virtual TPMs.

20. The method of claim 19, wherein the first VM is to receive a response to the command through the first control area in the hardware controller.

* * * * *